(12) United States Patent
Parsons et al.

(10) Patent No.: US 9,475,576 B2
(45) Date of Patent: *Oct. 25, 2016

(54) FLEXBEAM ROTOR ATTACHMENT TO ROTOR BLADE

(71) Applicant: Sikorsky Aircraft Corporation, Stratford, CT (US)

(72) Inventors: Eric S. Parsons, New Haven, CT (US); Eric Lucien Nussenblatt, Stamford, CT (US); Justin Thomas, New Haven, CT (US); Ryan Thomas Casey, San Diego, CA (US); David H. Hunter, Cheshire, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/702,081

(22) Filed: May 1, 2015

(65) Prior Publication Data

US 2016/0176521 A1 Jun. 23, 2016

Related U.S. Application Data

(63) Continuation of application No. 13/674,351, filed on Nov. 12, 2012, now Pat. No. 9,051,047.

(51) Int. Cl.
| | | |
|---|---|---|
| B64C 27/00 | (2006.01) |
| B64C 27/473 | (2006.01) |
| B64C 27/04 | (2006.01) |
| B64C 27/33 | (2006.01) |
| B64C 27/48 | (2006.01) |

(52) U.S. Cl.
CPC ............ *B64C 27/473* (2013.01); *B64C 27/04* (2013.01); *B64C 27/33* (2013.01); *B64C 27/48* (2013.01)

(58) Field of Classification Search
None
See application file for complete search history.

(56) References Cited

U.S. PATENT DOCUMENTS

| | | | | |
|---|---|---|---|---|
| 4,566,856 A | * | 1/1986 | Miller | B64C 27/33 416/134 A |
| 4,643,606 A | | 2/1987 | Buchner | |
| 4,648,800 A | * | 3/1987 | Fradenburgh | B64C 27/33 416/134 A |
| 5,096,380 A | * | 3/1992 | Byrnes | B64C 27/33 416/134 A |
| 5,263,821 A | * | 11/1993 | Noehren | B64C 27/33 415/115 |
| 5,286,167 A | | 2/1994 | Byrnes et al. | |
| 5,364,230 A | * | 11/1994 | Krauss | B64C 27/20 416/134 A |
| 5,372,479 A | * | 12/1994 | Byrnes | B64C 27/33 416/134 A |
| 5,992,140 A | | 11/1999 | Hammond et al. | |
| 6,016,651 A | | 1/2000 | Hammond et al. | |
| 6,055,804 A | | 5/2000 | Hammond et al. | |
| 6,122,907 A | | 9/2000 | Frawley | |
| 6,126,398 A | * | 10/2000 | Bauer | B64C 27/51 416/134 A |
| 6,196,800 B1 | * | 3/2001 | Bauer | B64C 27/33 416/107 |

(Continued)

*Primary Examiner* — Medhat Badawi
(74) *Attorney, Agent, or Firm* — Cantor Colburn LLP

(57) ABSTRACT

A rotor blade assembly includes a flex-beam member and a torque tube surrounding the flex-beam member and extending partially along a rotor blade assembly length. A rotor blade surrounds the flex beam member and extends from the torque tube to a blade tip. A connecting assembly secures the rotor blade and the torque tube at the flex-beam member. The connecting assembly includes a first connecting member extending at least partially into the rotor blade assembly through the rotor blade from a first rotor blade side and a second connecting member located at a second rotor blade side. A clamping load between the first connecting member and the second connecting member secures the rotor blade and torque tube to the flex-beam member.

26 Claims, 7 Drawing Sheets

(56) References Cited

U.S. PATENT DOCUMENTS

| | | | |
|---|---|---|---|
| 6,921,249 B1* | 7/2005 | Haynie | B64C 27/33 416/134 A |
| 7,188,802 B2 | 3/2007 | Magre | |
| 7,506,775 B2 | 3/2009 | Hartzell et al. | |
| 7,607,306 B2 | 10/2009 | Steyer et al. | |
| 7,762,057 B2 | 7/2010 | Sloan et al. | |
| 7,836,701 B2 | 11/2010 | Zack et al. | |
| 8,069,647 B2 | 12/2011 | Anderson | |
| 2005/0146087 A1* | 7/2005 | Russell | B64C 27/001 267/140.11 |
| 2008/0003106 A1* | 1/2008 | Kismarton | B64C 27/32 416/134 A |
| 2009/0025362 A1 | 1/2009 | Chapkovich et al. | |
| 2011/0243731 A1* | 10/2011 | Meyer | B64C 27/35 416/1 |
| 2011/0243734 A1* | 10/2011 | Schmaling | B64C 27/322 416/107 |
| 2013/0280075 A1* | 10/2013 | Kuntze-Fechner | B64C 27/33 416/204 R |
| 2013/0280076 A1* | 10/2013 | Kuntze-Fechner | B64C 27/33 416/204 R |
| 2013/0315734 A1* | 11/2013 | Kuntze-Fechner | B64C 27/33 416/131 |
| 2014/0112785 A1* | 4/2014 | Kuntze-Fechner | B64C 27/51 416/134 A |
| 2014/0241885 A1* | 8/2014 | Kuntze-Fechner | B64C 27/33 416/134 A |
| 2015/0014476 A1* | 1/2015 | Parsons | B64C 27/473 244/17.11 |

\* cited by examiner

FLEXBEAM ROTOR ATTACHMENT TO ROTOR BLADE

CROSS-REFERENCE TO RELATED APPLICATIONS

This application is a continuation of U.S. patent application Ser. No. 13/674,351 filed Nov. 12, 2012, the entire contents of which are incorporated herein by reference.

BACKGROUND

The subject matter disclosed herein generally relates to rotors for aircraft use. More specifically, the subject disclosure relates to flexbeam rotors for helicopters or other rotorcraft.

In typical flexbeam helicopter rotors, a flexbeam extends from a rotor hub and is connected to a torque tube and blade via a bolted joint at, for example, midspan of the rotor. The joint comprises a pattern of two or more fasteners, in some rotors four or six fasteners, such as bolts, extending through the torque tube, rotor blade and flex beam at that location, in a direction perpendicular to the torque tube and rotor blade. The joint is utilized to restrict relative motion of the torque tube, rotor blade and flex beam, and to provide a load path for loads acting on the rotor blade to be transmitted to the flex beam and then into the rotor hub.

To accommodate the array of bolts at the joint, a height of the blade assembly must be increased at the joint location, which results in increased drag for the rotor blade assembly. Further, heads of the bolts and/or nuts used in the joint are often left protruding from the outer mold line, or outer design surface of the rotor blade, resulting in yet additional drag on the rotor blade. Further, a hole pattern for the bolted assembly is difficult to fabricate, as very close tolerances on hole sizes and positions must be maintained to ensure that the bolts can be installed through the three components, while still fitting the bolts closely enough to restrict relative motion and provide the load path as intended. Additionally, the joint comprising a pattern of multiple bolts requires a high preload, in some assemblies in the range of 15,000 pounds force, which may damage composite parts used in the assembly, or alternatively requires a very robust design of the components resulting in increased weight of the components and the rotor blade assembly.

BRIEF SUMMARY

According to one aspect of the invention, a rotor blade assembly includes a flex-beam member and a torque tube surrounding the flex-beam member and extending partially along a rotor blade assembly length. A rotor blade surrounds the flex beam member and extends from the torque tube to a blade tip. A connecting assembly secures the rotor blade and the torque tube at the flex-beam member. The connecting assembly includes a first connecting member extending at least partially into the rotor blade assembly through the rotor blade from a first rotor blade side and a second connecting member located at a second rotor blade side. A clamping load between the first connecting member and the second connecting member secures the rotor blade and torque tube to the flex-beam member.

According to another aspect of the invention, a main rotor assembly for a rotor craft includes a rotor hub and a plurality of rotor blades assemblies. Each rotor blade assembly includes a flex-beam member secured to the rotor hub and a torque tube surrounding the flex-beam member and extending partially along a rotor blade assembly length. A rotor blade surrounds the flex beam member and extends from the torque tube to a blade tip. A connecting assembly secures the rotor blade and the torque tube at the flex-beam member. The connecting assembly includes a first connecting member extending at least partially into the rotor blade assembly through the rotor blade from a first rotor blade side and a second connecting member located at a second rotor blade side. A clamping load between the first connecting member and the second connecting member secures the rotor blade and torque tube to the flex-beam member.

According to yet another aspect of the invention, a helicopter includes an airframe, a drive system, and a main rotor assembly operably connected to the drive system. The main rotor assembly includes a rotor hub and a plurality of rotor blades assemblies. Each rotor blade assembly includes a flex-beam member secured to the rotor hub and a torque tube surrounding the flex-beam member and extending partially along a rotor blade assembly length. A rotor blade surrounds the flex beam member and extends from the torque tube to a blade tip. A connecting assembly secures the rotor blade and the torque tube at the flex-beam member. The connecting assembly includes a first connecting member extending at least partially into the rotor blade assembly through the rotor blade from a first rotor blade side and a second connecting member located at a second rotor blade side. A clamping load between the first connecting member and the second connecting member secures the rotor blade and torque tube to the flex-beam member.

These and other advantages and features will become more apparent from the following description taken in conjunction with the drawings.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments, together with advantages and features, by way of example with reference to the drawings.

DETAILED DESCRIPTION

Figure 1:
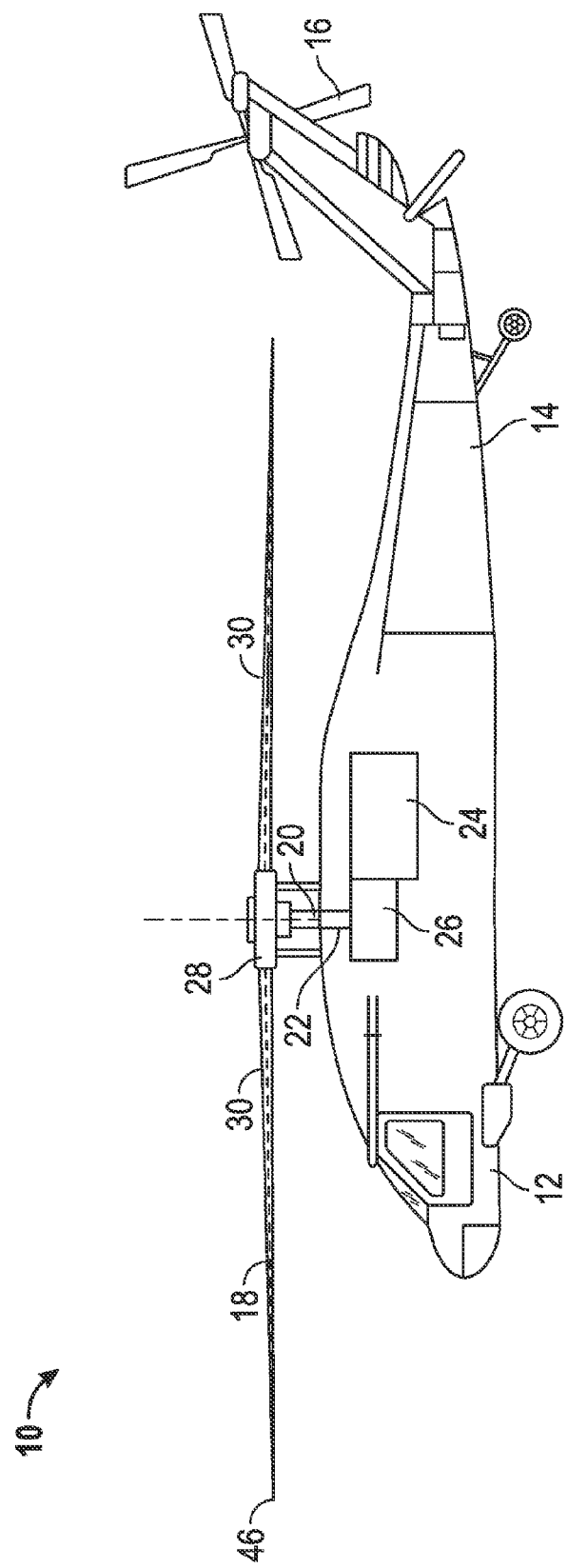
FIG. 1 is a schematic view of an embodiment of a helicopter.

Shown in FIG. 1 is schematic view of an embodiment of an aircraft, in this embodiment a helicopter 10. The helicopter 10 includes an airframe 12 with an extending tail 14 and a tail rotor 16 located thereat. While the embodiment of a helicopter 10 described herein includes an extending tail 14 and tail rotor 16, it is to be appreciated that the disclosure herein may be applied to other types of rotor craft. A main rotor assembly 18 is located at the airframe 12 and rotates about a main rotor axis 20. The main rotor assembly 18 is driven by a drive shaft 22 connected to a power source, for example, an engine 24 by a gearbox 26.

The main rotor assembly 18 includes a hub member 28 located at the main rotor axis 20 and operably connected to the drive shaft 22. A plurality of blade assemblies 30 are connected to the hub member 28.

Figure 2:
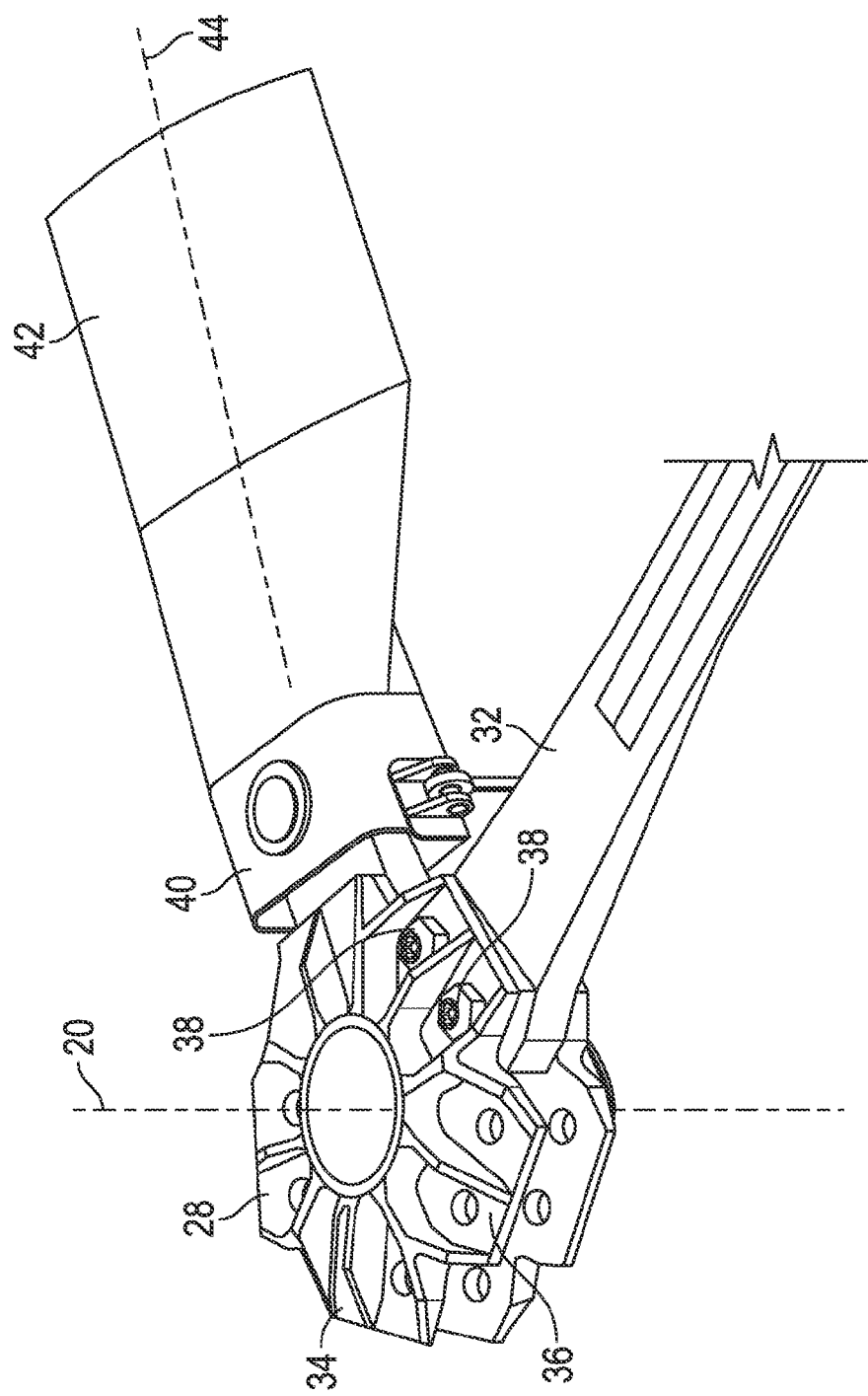
FIG. 2 is a perspective view of an embodiment of a rotor hub and blade assembly.

Referring now to FIG. 2, each blade assembly 30 includes a flex-beam member 32 secured to the hub member 28 and extending radially outwardly therefrom. In one embodiment, the hub member 28 includes vertically spaced first hub plate 34 and second hub plate 36, with the flex-beam member 32 positioned between the first hub plate 34 and second hub plate 36. One or more hub fasteners 38, for example, one or more bolts, extend through the first hub plate 34, flex-beam member 32 and second hub plate 36 to secure the flex-beam member 32 to the hub member 28. A torque tube 40 is positioned around the flex-beam member 32 and extends radially outwardly along the flex beam member 32. A rotor blade 42 has an airfoil-shaped cross section and is secured to the torque tube 40 and the flex-beam member 32 to extend radially outwardly along a blade axis 44 to a blade tip 46 (shown in FIG. 1). In some embodiments, the torque tube 40 and rotor blade 42 are assembled into a unitary assembly prior to installation over the flex-beam member 32.

Figure 3:
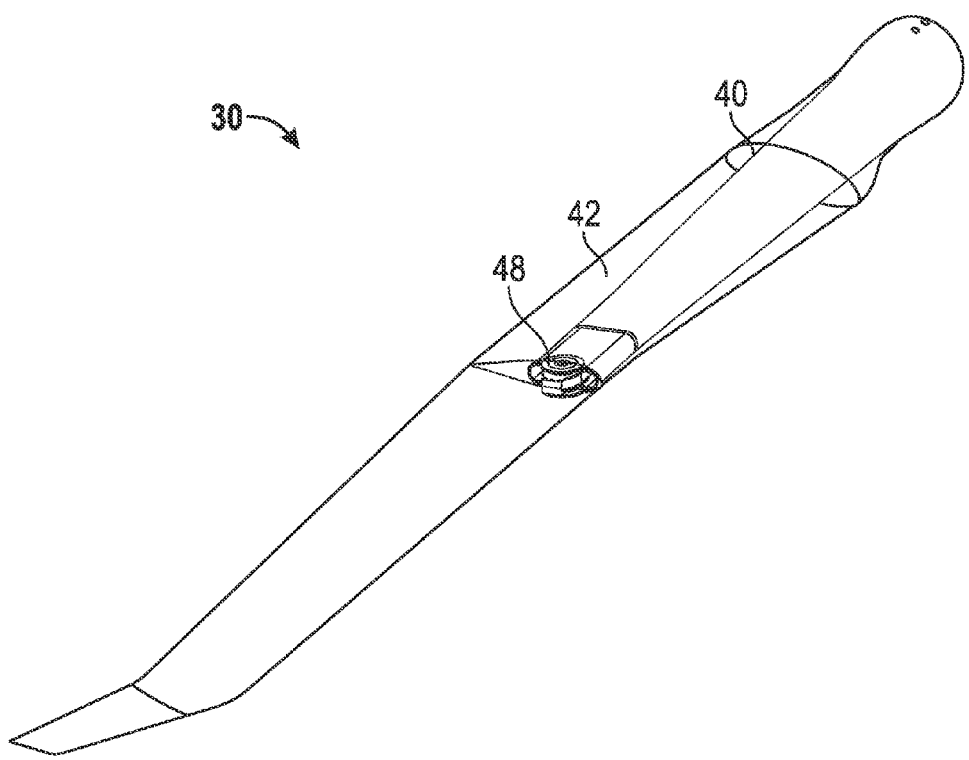
FIG. 3 is a perspective view of an embodiment of a rotor blade assembly for a helicopter.
Figure 4:
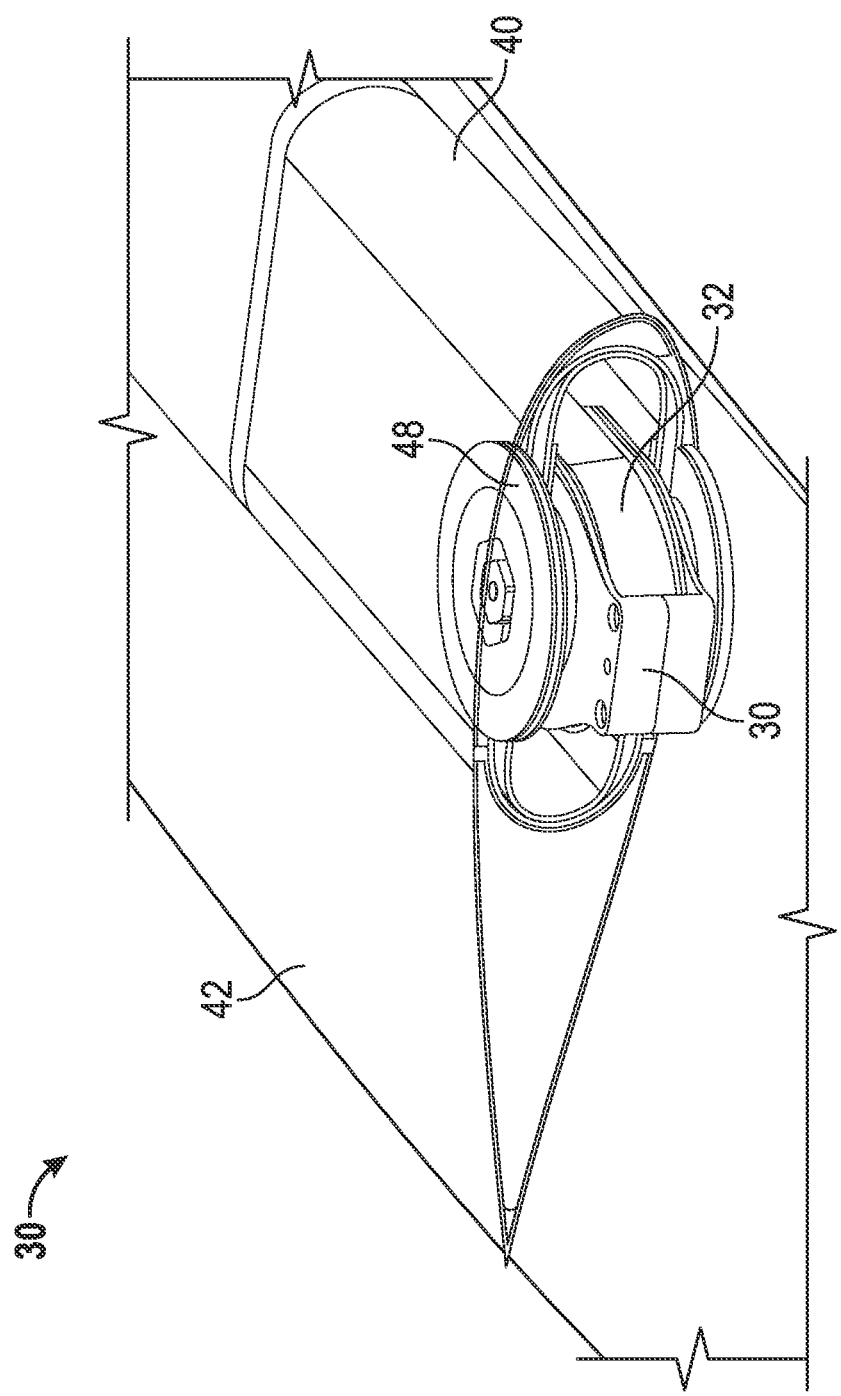
FIG. 4 is a partial cross-sectional view of an embodiment of a rotor blade assembly for a helicopter.

Referring to FIGS. 3 and 4, the flex-beam member 32 is connected to the torque tube 40 and rotor blade 42 via a single connecting pin assembly 48. Referring to the partial cross-sectional view of FIG. 4, the connecting pin assembly 48 extends through the torque tube 40, rotor blade 42 and the flex-beam member 32 to secure the rotor blade assembly 30.

Figure 5:
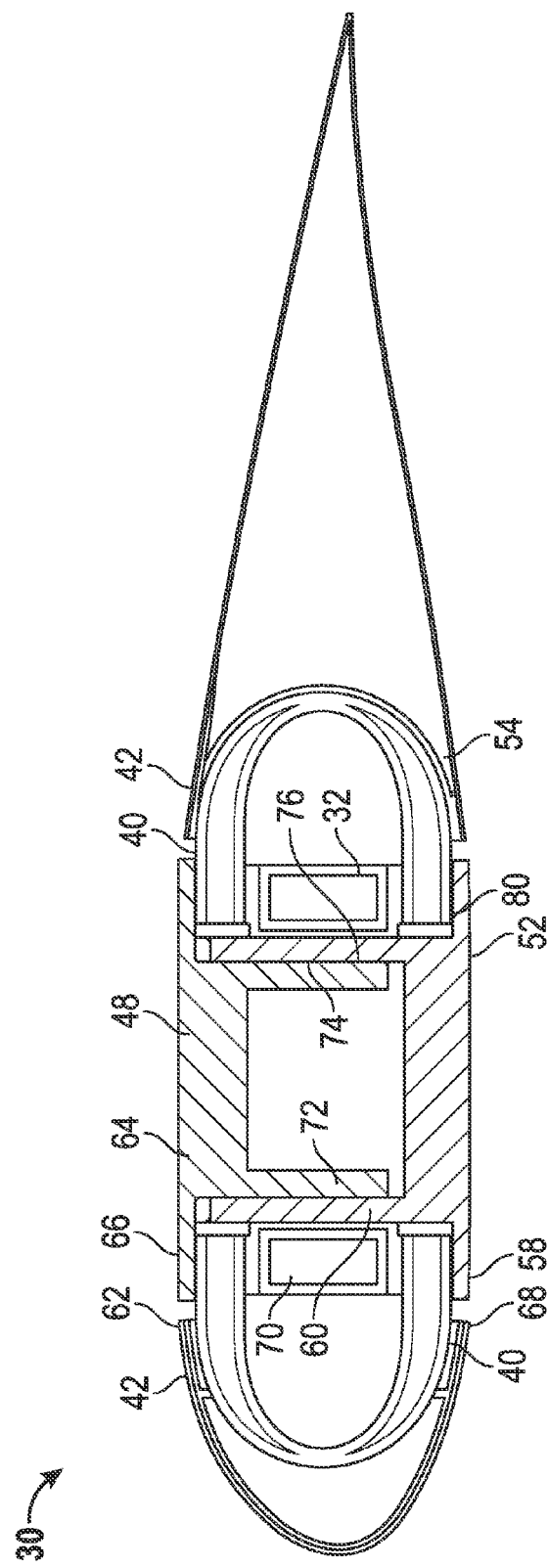
FIG. 5 is another cross-sectional view of an embodiment of a rotor blade assembly for a helicopter.

Referring now to FIG. 5, the connecting pin assembly 48 includes an outer pin member 52 inserted into the stacked assembly of rotor blade 42, torque tube 40 and flex beam member 32, from a first side, in this embodiment a lower side 54 of the rotor blade assembly 30. The outer pin member 52 has a circular first head 58, and an annular first shaft 60 extending through a rotor blade opening 68 and flex beam opening 70 toward a second side, in this embodiment an upper side 62, of the rotor blade assembly 30. An inner pin member 64 is installed into the outer pin member 52 from the second side, or upper side 62, of the blade assembly 30, so that the rotor blade 42, torque tube 40 and flex-beam member 32 are captured between the first head 58 and a second head 66 of the inner pin member 64. The connecting pin assembly 48 is preloaded to retain the rotor blade 42, torque tube 40 and flex-beam member 32 between the first head 58 and the second head 66, thereby restricting relative motion between the components. In some embodiments, a sleeve 80 is located between the flex beam member 32 and the outer pin member 52 to provide a continuous interface for the outer pin member 52 and to prevent bearing wear of the flex beam member 32. In some embodiments, the sleeve 80 is a metallic component formed from, for example, an aluminum material.

In some embodiments, as shown in FIG. 5, the inner pin member 64 includes a second shaft 72, which, when the inner pin member 64 is installed, is located inside of the first shaft 60. In some embodiments, an outer surface 74 of the second shaft 72 is threaded, as is an inner surface 76 of the first shaft 60, so that the necessary preload is achieved by threading the second shaft 72 into the first shaft 60. In other embodiments, the preload may be achieved by utilizing a plurality of smaller bolts extending through the first head 58 and second head 68.

Figure 6:
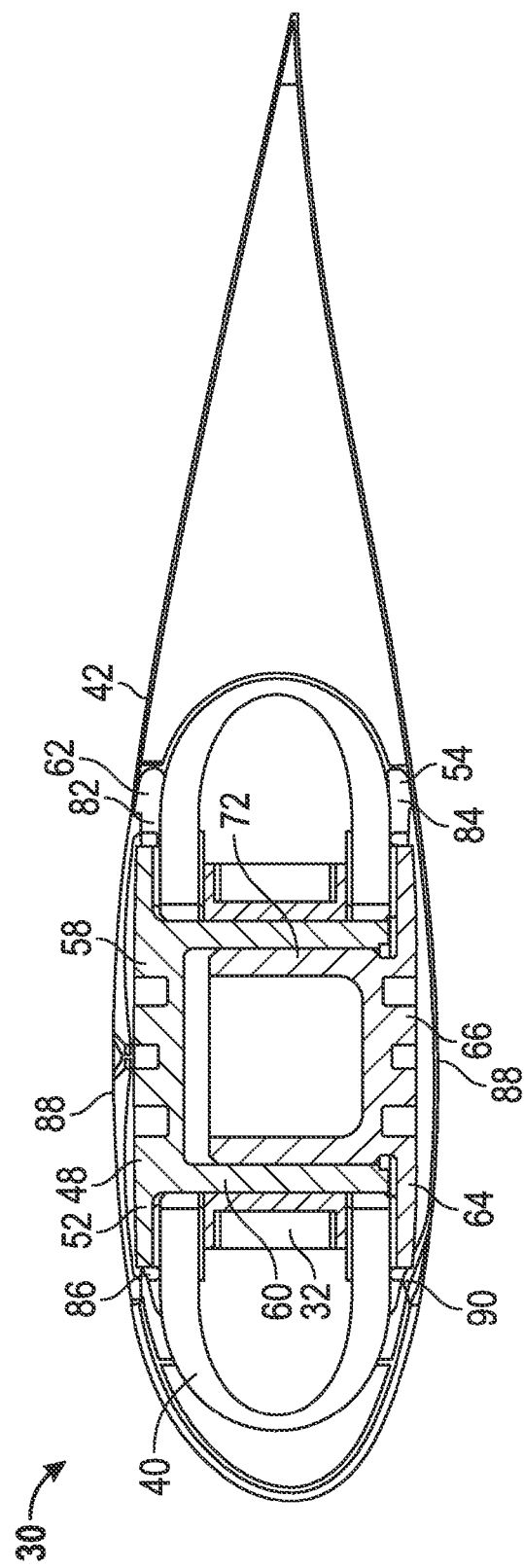
FIG. 6 is a cross-sectional view of another embodiment of a rotor blade assembly for a helicopter.
Figure 7:
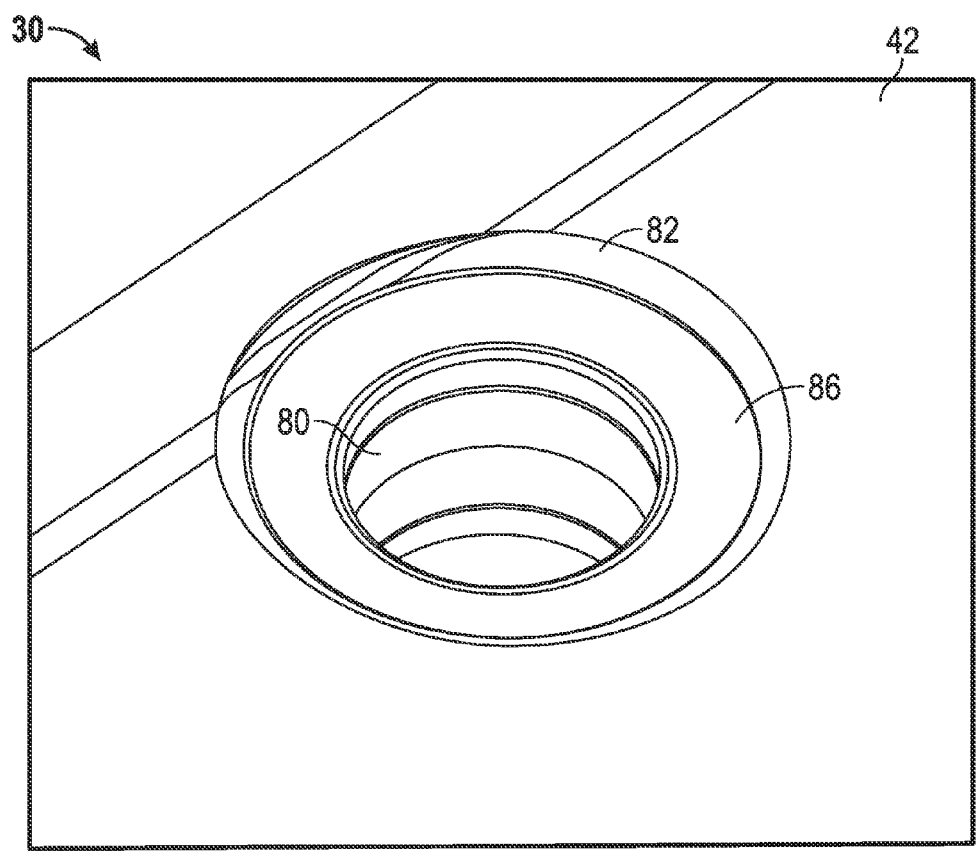
FIG. 7 is a perspective view of a countersunk connection hole in a rotor blade.

In other embodiments, as shown in FIG. 6, the connecting pin assembly 48 is recessed inside of the lower side 54 and/or upper side 62 of the rotor blade 42 when installed. In these embodiments, the rotor blade 42 includes an upper airfoil block 82 and a lower airfoil block 84, with the outer pin member 52 installed in the upper side 62, specifically in a recessed hole or upper countersink 86 in the upper airfoil block 82, shown best in FIG. 7. Referring again to FIG. 6, the result is, when installed, the first head 58 is located recessed inside of the upper side 62. In some embodiments, a fastener cover 88 is installed over the first head 58 to provide an aerodynamic surface continuous with the upper side 62. As can be understood from FIG. 6, inner pin member 64 is similarly installed in lower side 54, in a lower countersink 90 in the lower airfoil block 84. A fastener cover 88 in installed over the second head 66 to provide a continuous aerodynamic surface with the lower side 54.

The use of one large connecting pin assembly 48 having an increased amount of surface area greatly reduces a preload required to secure the rotor blade 42 and torque tube 40 to the flex-beam member 32. For example, a connecting pin assembly 48 with a shaft diameter in the range of 2½" to 3" and a head diameter in the range of 3½ " to 4" requires a preload of about 1,000 pounds force which is a significant decrease from a 15,000 pound force preload required in a typical joint having multiple ⅜" diameter bolts. The reduced preload allows the head of the connecting pin assembly 48 to have a reduced thickness and fit within an outer surface profile of the rotor blade 42. Further, the increased diameter of the connecting pin assembly 48 and the opening into which it is received in the rotor blade assembly 30 allow for easier manufacturing of the rotor blade assembly 30, as the opening may be formed to a finished diameter by insertion of a machining tool into the opening after assembly of the components. Further, with this configuration, it is possible to manufacture the torque tube 40 and the rotor blade 42 as a single unitary component, reducing parts count and increasing reliability.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A rotor blade assembly comprising;
 a flex-beam member;
 a torque tube surrounding the flex-beam member and extending partially along a rotor blade assembly length;
 a rotor blade surrounding the flex beam member extending from the torque tube to a blade tip; and
 a connecting assembly to secure the rotor blade and the torque tube at the flex-beam member, the connecting assembly including:
  a first connecting member extending at least partially into the rotor blade assembly through the rotor blade from a first rotor blade side; and
  a second connecting member disposed at a second rotor blade side;

wherein a clamping load between the first connecting member and the second connecting member secures the rotor blade and torque tube to the flex-beam member.

2. The rotor blade assembly of claim 1, further comprising a threaded connection between the first connecting member and the second connecting member.

3. The rotor blade assembly of claim 1, wherein the first connecting member includes a first shaft extending at least partially into the rotor blade assembly through the rotor blade from the first rotor blade side.

4. The rotor blade assembly of claim 3, wherein the first connecting first shaft has a first shaft diameter in the range of about 2½ to 3 inches.

5. The rotor blade assembly of claim 1, wherein the clamping load is between a first head of the first connecting member and a second head of the second connecting member.

6. The rotor blade assembly of claim 5, wherein at least one of the first head and the second head have a head diameter in the range of about 3½ to 4 inches.

7. The rotor blade assembly of claim 1, wherein the clamping load is about 1000 pounds force.

8. The rotor blade assembly of claim 1, wherein the first connecting member and the second connecting member are substantially flush with an outer surface of the rotor blade.

9. The rotor blade assembly of claim 1, wherein the torque tube and the rotor blade are formed as a unitary component.

10. A rotor assembly for a rotor craft comprising:
a rotor hub; and
a plurality of rotor blades assemblies, each rotor blade assembly including:
a flex-beam member secured to the rotor hub;
a torque tube surrounding the flex-beam member and extending partially along a rotor blade assembly length;
a rotor blade surrounding the flex beam member extending from the torque tube to a blade tip; and
a connecting assembly to secure the rotor blade and the torque tube at the flex-beam member, the connecting assembly including:
a first connecting member extending at least partially into the rotor blade assembly through the rotor blade from a first rotor blade side; and
a second connecting member disposed at a second rotor blade side;
wherein a clamping load between the first connecting member and the second connecting member secures the rotor blade and torque tube to the flex-beam member.

11. The rotor assembly of claim 10, further comprising a threaded connection between the first connecting member and the second connecting member.

12. The rotor assembly of claim 10, wherein the first connecting member includes a first shaft extending at least partially into the rotor blade assembly through the rotor blade from the first rotor blade side.

13. The rotor assembly of claim 12, wherein the first shaft has a shaft diameter in the range of about 2½ to 3 inches.

14. The rotor assembly of claim 12, wherein the clamping load is between a first head of the first connecting member and a second head of the second connecting member.

15. The rotor assembly of claim 14, wherein at least one of the first head and the second head have a head diameter in the range of about 3½ to 4 inches.

16. The rotor assembly of claim 12, wherein the clamping load is about 1000 pounds force.

17. The rotor assembly of claim 10, wherein the first connecting member the second connecting member are substantially flush with an outer surface of the rotor blade.

18. The rotor assembly of claim 10, wherein the torque tube and the rotor blade are formed as a unitary component.

19. A helicopter comprising:
an airframe;
a drive system; and
a rotor assembly operably connected to the drive system including:
a rotor hub; and
a plurality of rotor blades assemblies, each rotor blade assembly including:
a flex-beam member secured to the rotor hub;
a torque tube surrounding the flex-beam member and extending partially along a rotor blade assembly length;
a rotor blade surrounding the flex beam member extending from the torque tube to a blade tip; and
a connecting assembly to secure the rotor blade and the torque tube at the flex-beam member, the connecting assembly including:
a first connecting member extending at least partially into the rotor blade assembly through the rotor blade from a first rotor blade side; and
a second connecting member disposed at a second rotor blade side;
wherein a clamping load between the first connecting member and the second connecting member secures the rotor blade and torque tube to the flex-beam member.

20. The helicopter of claim 19, further comprising a threaded connection between the first connecting member and the second connecting member.

21. The helicopter of claim 19, wherein the first connecting member includes a first shaft extending at least partially into the rotor blade assembly through the rotor blade from the first rotor blade side.

22. The helicopter of claim 21, wherein the first shaft has a shaft diameter in the range of about 2½ to 3 inches.

23. The helicopter of claim 19, wherein the clamping load is between a first head of the first connecting member and a second head of the second connecting member.

24. The helicopter of claim 23, wherein at least one of the first head and the second head have a head diameter in the range of about 3½ to 4 inches.

25. The helicopter of claim 19, wherein the clamping load is about 1000 pounds force.

26. The helicopter of claim 19, wherein the first connecting member and the second connecting member are substantially flush with an outer surface of the rotor blade.

* * * * *